(12) United States Patent
Levy (10) Patent No.: US 8,792,013 B2
(45) Date of Patent: Jul. 29, 2014

(54) METHOD FOR DETERMINING THE EXTENT OF A FOREGROUND OBJECT IN AN IMAGE

(75) Inventor: Noam Levy, Karmiel (IL)

(73) Assignee: Qualcomm Technologies, Inc., San Diego, CA (US)

( * ) Notice: Subject to any disclaimer, the term of this patent is extended or adjusted under 35 U.S.C. 154(b) by 137 days.

(21) Appl. No.: 13/453,749

(22) Filed: Apr. 23, 2012

(65) Prior Publication Data

US 2013/0278788 A1  Oct. 24, 2013

(51) Int. Cl.
*H04N 5/228* (2006.01)

(52) U.S. Cl.
USPC ........ 348/222.1; 348/135; 348/188; 362/173; 362/190; 362/274

(58) Field of Classification Search
CPC .......... H04N 5/14; G06T 7/00; G06T 7/0079; G06T 7/0081
USPC ........ 348/222.1, 135, 188; 382/173, 190, 274
See application file for complete search history.

(56) References Cited

U.S. PATENT DOCUMENTS

| 5,093,725 | A * | 3/1992 | Gans et al. ................. 348/608 |
| 7,868,922 | B2 | 1/2011 | Ciuc et al. |
| 7,990,429 | B2 | 8/2011 | Saito |
| 2003/0086018 | A1 * | 5/2003 | Berman et al. ............ 348/584 |
| 2005/0271274 | A1 * | 12/2005 | Urano et al. ............... 382/173 |
| 2008/0259176 | A1 * | 10/2008 | Tamaru ........................ 348/222.1 |
| 2009/0219379 | A1 * | 9/2009 | Rossato et al. ............ 348/14.01 |
| 2010/0026732 | A1 * | 2/2010 | Otawara ....................... 345/690 |
| 2010/0079609 | A1 * | 4/2010 | Hwang et al. ............. 348/222.1 |
| 2010/0201809 | A1 * | 8/2010 | Oyama et al. ............. 348/135 |
| 2010/0245609 | A1 | 9/2010 | Estevez |
| 2011/0134242 | A1 * | 6/2011 | Loubser et al. ............ 348/143 |
| 2011/0150349 | A1 * | 6/2011 | Kojima et al. ............. 382/224 |
| 2011/0229052 | A1 | 9/2011 | Li et al. |
| 2013/0278788 | A1 * | 10/2013 | Levy ........................... 348/222.1 |

FOREIGN PATENT DOCUMENTS

WO   2013107037 A1   7/2013

OTHER PUBLICATIONS

Search Report for British Patent Application No. 01304635.4 mailed Aug. 30, 2013.

* cited by examiner

*Primary Examiner* — Antoinette Spinks
(74) *Attorney, Agent, or Firm* — John W. Branch; Lowe Graham Jones PLLC (57) ABSTRACT

Embodiments are directed towards determining within a digital camera whether a pixel belongs to a foreground or background segment within a given image by evaluating a ratio of derivative and deviation metrics in an area around each pixel in the image, or ratios of derivative metrics across a plurality of images. For each pixel within the image, a block of pixels are examined to determine an aggregate relative derivative (ARD) in the block. The ARD is compared to a threshold value to determine whether the pixel is to be assigned in the foreground segment or the background segment. In one embodiment, a single image is used to determine the ARD and the pixel segmentation for that image. Multiple images may also be used to obtain ratios of a numerator of the ARD, useable to determine an extent of the foreground.

18 Claims, 8 Drawing Sheets

METHOD FOR DETERMINING THE EXTENT OF A FOREGROUND OBJECT IN AN IMAGE

TECHNICAL FIELD

The present embodiments relate generally to digital image processing and, more particularly, but not exclusively, to determining a foreground extent of an image in part by evaluating a ratio of derivative and deviation metrics in an area around each pixel in the image, or ratios of derivative metrics in an area around each pixel across a plurality of images.

BACKGROUND

In using a digital camera, it is often desirable to determine the extent of a foreground object in an image. In the art of computer vision, this is called segmentation. Briefly, segmentation refers to analyzing a digital image to identify features or objects in the image. Generally then, segmentation may be considered as partitioning the image into one or more segments where pixels within a given segment have some feature similarity to other pixels within the same given segment. One such feature similarity is a distance that a segment of pixels are from a viewer of the image (or the distance from the camera).

Segmentation can be used, for example, to create specialized effects with the image, such as by blurring the background segment of the image to emphasize the foreground segment of the image, or replacing background segment(s) partially or entirely with another segment. Further, segmentation may helpful in developing three-dimensional image effects by distinguishing between objects or portions of objects based on their distance from the camera, or viewer of the image. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video images (herein also referred to as frames) which may be spaced in time.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards determining within a digital camera, or other device having an image capturing component, whether a pixel belongs to a foreground or background segment within a given image. This may be performed by evaluating a ratio of derivative and deviation metrics in an area around each pixel in the image, or ratios of derivative metrics in an area around each pixel across a plurality of images. For each pixel within the image, a block of pixels are examined to determine an aggregate relative derivative (ARD) in the block. The ARD is compared to a threshold value to determine whether the pixel is to be assigned in the foreground segment or the background segment. In one embodiment, a single image is used to determine the ARD and pixel segmentation for that image.

In one embodiment, however, the ARD may be transformed to a depth map for the image. The depth map may then be analyzed to determine an extent of a foreground object by selecting all pixels which are defined to be close in both a depth and location to an estimated location and depth of the foreground object.

In one embodiment, prior to capturing a K number of images, a determination is made on a distance of a furthest object in an image. The K images are then captured, where a first image is focused on a foreground object, the last image is focused on the furthest object, and each of the other images are captured at various focus positions in-between these two focus positions. Aggregate derivative for each block around (or otherwise enveloping) a same pixel for each of the K images are computed, for all pixels in the images. K−1 ratios of the aggregate derivatives are computed by dividing each aggregate derivative in K−1 images into the aggregate derivative of the first image for each same pixel across the images. A combination of the ratios for a given pixel may then be compared to a threshold to determine whether the pixel is part of the foreground object or background. In one embodiment, the ratios may be transformed to a depth map, which may then be analyzed to determine the extent of the foreground object. In another embodiment, a maximum value of the ratios may be selected as representing the ARD for a given block around the given pixel.

As disclosed further below, in one embodiment, pre-processing of the K images may be performed to align the images to enable more effective identification of collocated pixels across the images. Such alignment is sometimes called registration. In other embodiments, various post-processing may be performed, including performing morphological closing to create a single connected and closed foreground, performing dilation to cover borders of the foreground object, or the like.

In still another embodiment, a binary hard separation may be transformed to a fuzzy continuous separation to create a fuzzy decision border for selecting pixels as foreground. Still other embodiments are discussed further below.

Illustrative Operating Environments

Figure 1:
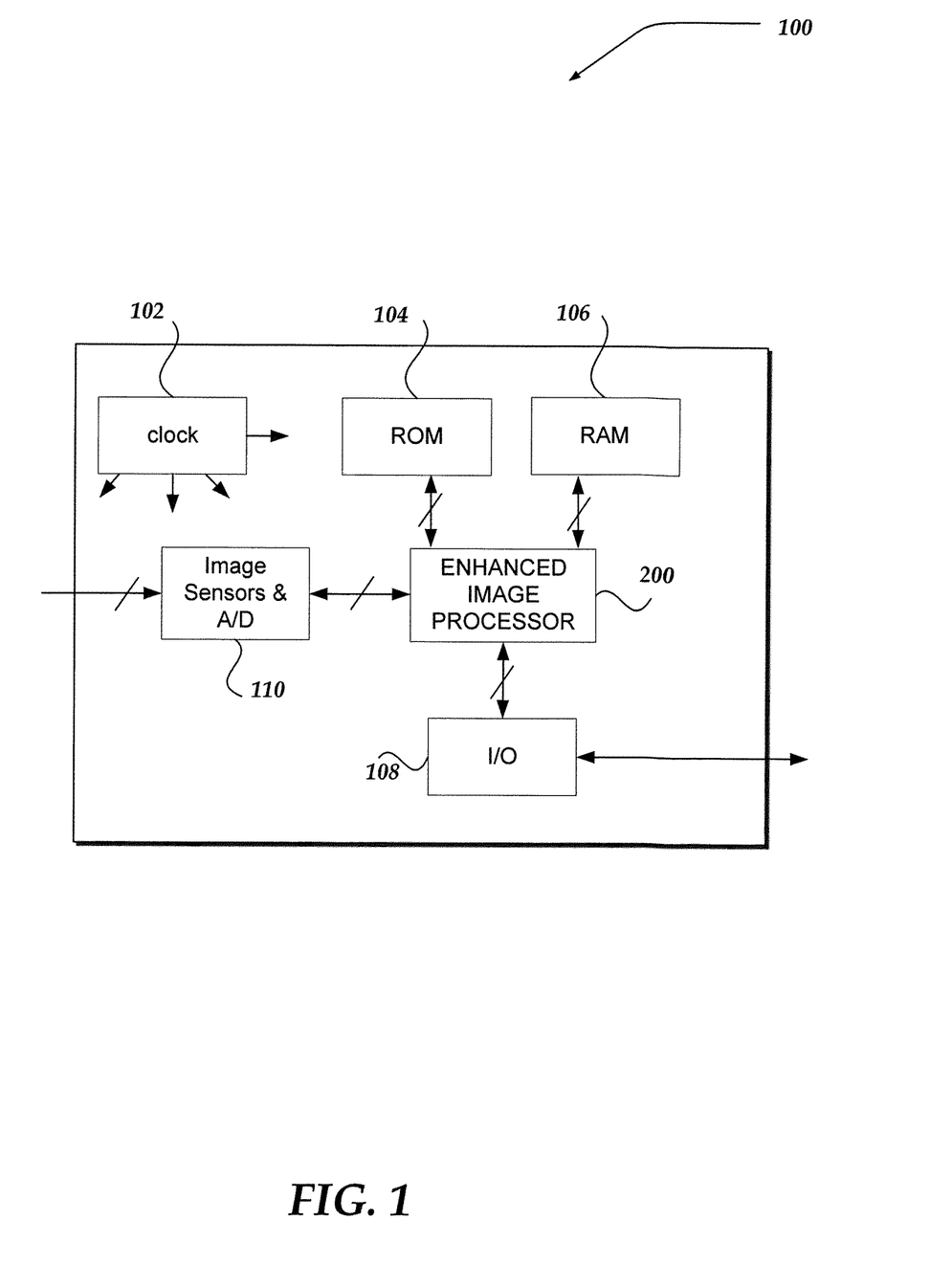
FIG. 1 illustrates a system diagram of one embodiment of an environment in which the embodiments may be practiced.

FIG. 1 shows components of an environment in which embodiments may be practiced.

Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including video cameras, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to receive and process images, including image sequences. In one embodiment, system 100 may include components not shown, such as a lens or other optical elements, and image sensor(s) for receiving images that may be converted into a digital image for storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data, such as one or more frames of image data for use by EIP 200 or output data from EIP 200, as well as to store focus position data, ARD map data, derivative data, threshold data, segmentation maps, and any of a variety of other data useable in performing actions discussed below, and the like. A separate non-volatile read-only memory (ROM) memory chip 104 is also coupled to EIP 200 and may be employed for storage of a processor program, calibration data, look-up tables (LUTS), weighting functions, non-linear functions, and a variety of other data useable by system 100. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received one or more frames of image data to determine a segmentation map for use with the an image, compress the image, and store or otherwise send a resulting compressed (encoded) bit-stream of data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Also illustrated, is an analog-to-digital converter (A/D) 110 that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). A/D 110 may then provide the digital data to EIP 200 for processing.

Figure 2:
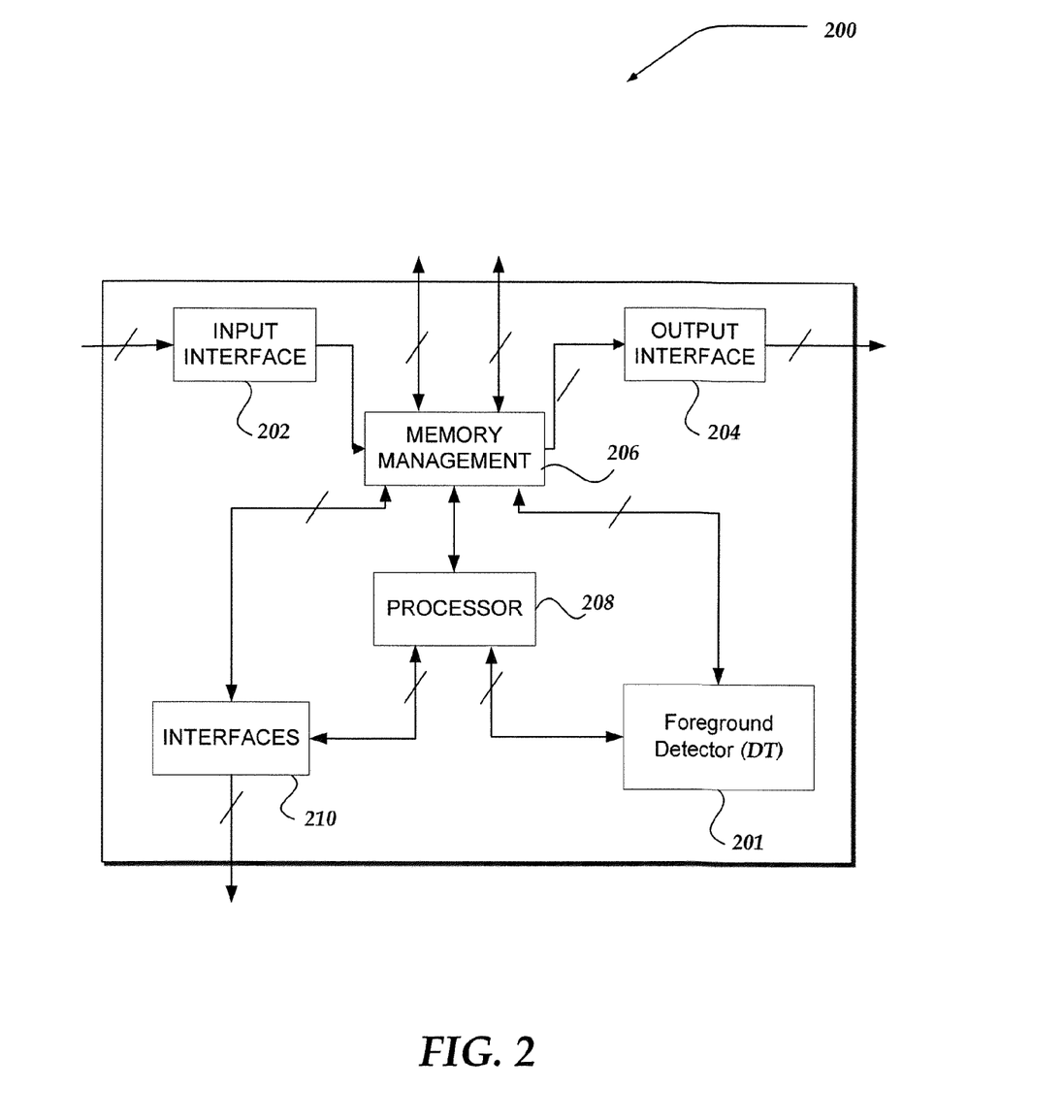
FIG. 2 shows one embodiment of an enhanced image processor usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include processor 208 that may represent a general purpose or a specialized central processing unit (CPU) that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames may be received by input interface circuit 202 and communicated to other components by connection through memory management device 206. In one embodiment, Foreground Detector (DT) 201 may be employed as described further below, to generate a segmentation map indicating whether each pixel within a captured image belongs to a foreground or background segment within the image. The output image and/or its segmentation map may compressed into a compressed bit-stream representing the image and segmentation map that may be output through output interface circuit 204 to various memory storage devices, or even over a network, including, a wireless and/or wired network, to another device. In one embodiment, the compressed image may be stored in a memory device, separate from the image. Further, in one embodiment, the segmentation map need not be compressed. It should be noted that is one embodiment, DT 201 may be performed within processor 208. In another embodiment, DT 201 may be implemented using integrated circuits to perform its actions.

Interfaces 210 may provide for various mechanisms to communicate with processor 208 and/or memory management 206, other components, to enable modifications to various actions, provide status of an action, or the like by another device, an end-user, or the like.

Illustrative Network Device

Figure 3:
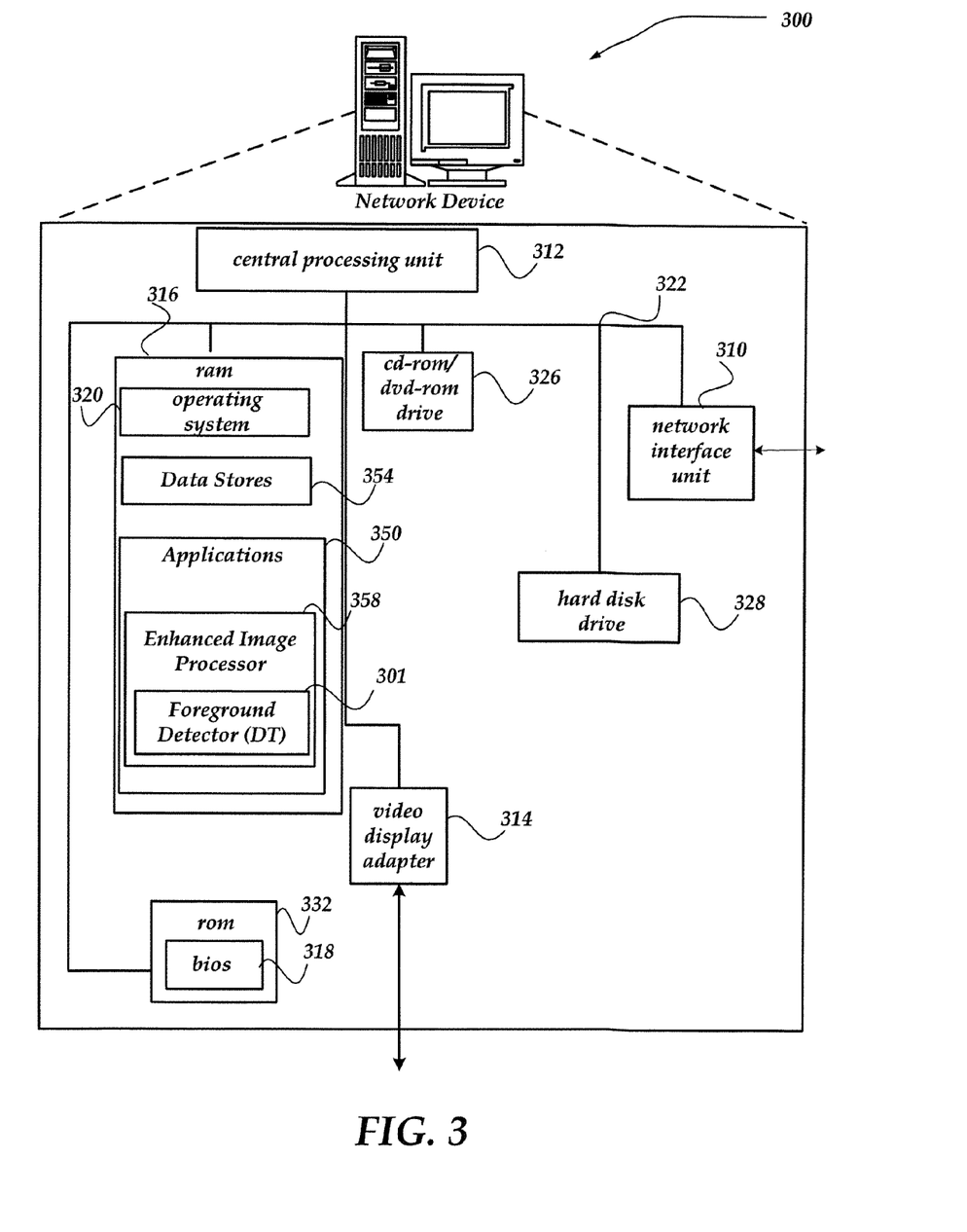
FIG. 3 illustrates a system diagram of another embodiment of an environment in which the embodiments may be practiced.

FIG. 3 shows one embodiment of another device useable with another embodiment of the EIP. Network device 300 may include many more or less components than those shown. The components shown, however, are sufficient to disclose an illustrative embodiment for practicing the invention. Network device 300 may represent any of a variety of computing devices, including, but not limited to personal computers, desktop computers, multiprocessor systems, microprocessor-based or programmable electronics, a rack mounted multi-processing configuration, network PCs, televisions, camera systems, server devices, network appliances, and the like. In one embodiment, network device 300 may also operate as a laptop computer, or similar handheld computer system. In at least one embodiment, network device 300 may include an image capturing component, such as a camera useable for capturing image data.

In one embodiment, while a single network device 300 is illustrated, operations discussed with respect to at least the EIP, may also be distributed across a plurality of computing devices, for example, such as might arise within a cloud architecture, a peer-to-peer structure, a cluster architecture, or other distributed architectures.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network device 300. Any general-purpose operating system or special purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Moreover, in at least one embodiment, Network interface unit 310 may be configured to interface with an image capturing component, such as a camera, lens assembly, or the like, such as disclosed above in conjunction with FIG. 1.

The mass memory as described above illustrates another type of computer-readable or processor-readable device, namely non-transitory computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of non-transitory computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store data useable for Foreground Detector (DT) 301, including, focus range data, threshold data, function look-ups, tables, image data, and/or any of a variety of data useable within one or more of the processes discussed below. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, customizable user interface programs, security programs, and so forth. Memory may also include EIP 358 which may further include DT 301. It should be recognized that while EIP 358 and DT 301 are illustrated within RAM 316, other embodiments may include EIP 358 and/or DT 301 within ROM 332, and/or within one or more separate circuit boards (not shown) within network device 300.

EIP 358 and DT 301 operate substantially similar to EIP 200 and DT 201 of FIGS. 1-2, respectively, to provide segmentation mapping useable with an image, as described in more detail below.

It should be recognized that EIP 358 and DT 301 may operate on image data obtained from data stores 354, hard disk drive 328, cd-rom/dvd-rom drive 326, other storage devices, or even from a network or from another device through network interface unit 310, as well as from various image sensing devices, or the like.

Generalized Operation

The operation of certain aspects of the invention will now be described with respect to FIGS. 4-8. As discussed above, embodiments are directed towards determining within a digital camera, or other digital image capturing device, whether a pixel belongs to a foreground or background segment within a captured image. Briefly, to determine whether a pixel belongs to a foreground or a background portion of the image, a block around (or enveloping) a pixel is determined. A feature within each block herein called an aggregate relative derivative (ARD) is evaluated. This feature may then be used to determine an amount a pixel is blurred due to a lens defocus, which in turn may be used to determine foreground portions, in one embodiment, where the ARD is above a threshold value. In an alternative embodiment, a plurality of images is used to determine the segmentation of a given image. The result is a segmentation map indicating whether a given pixel within the image is assignable to a foreground segment or a background segment of the image. That is, in one embodiment, the output is a binary, segmentation map, M(x, y), which has a value corresponding to each image pixel. The value may be interpreted either as "foreground" or "background," in one embodiment. For example, within the segmentation map, M(150,100)='foreground'—the pixel at the 150th column and the 100th row is a foreground pixel. Other implementations might use numeric values to indicate the segmentation. Thus, embodiments are not limited to this example.

Moreover, it is noted that in other embodiments, extensions may be implemented where the image includes multiple background and/or foreground segments, such as might be determined based on multiple different threshold evaluations. Thus, the segmentation map need not be a binary mapping, and instead include more values, than two.

Prior to discussion of the operations, a general background discussion may be helpful. It should be noted, however, that this discussion is not intended as an extensive overview. It is not intended to identify key or critical elements, or to delineate or otherwise narrow the scope. Its purpose is merely to present some background concepts in a simplified form as a prelude to the more detailed description that is presented below.

Let B(x,y) b a luminance value of a given block in an image, where x=0, ..., M−1, and x=0, ..., N−1. The values for M and N may be selected based on a variety of engineering criteria. For example, in one embodiment, M=N=32. However, other values may also be selected. In any event, a given block is assigned to each pixel in the image. Thus, it may readily be seen that blocks may overlap and include one or more neighboring pixels.

In any event, let $d_x(x,y)$ represent a horizontal derivative of luminance values of the image in a given block, and $d_y(x,y)$ be a vertical derivative of luminance values of the image in the same block. In one embodiment, because a block may encompass multiple pixels, although being assigned to a particular pixel, the derivative values may be obtained from each of the pixels encompassed by the block, either horizontally within the block or vertically within the block. Derivative values may be calculated using any of a variety of mechanisms, including, for example, convolving the image with a discrete filter of a selected shape. Other ways are also envisaged, and thus embodiments are not constrained to a particular mechanism for calculating or even estimating the horizontal and vertical derivates.

Then, an aggregation function, A(.) may be selected that takes all of the values of a certain operation on the block and gives a single, representative value. Some non-limiting, non-exhaustive examples include:

$$A[f(x,y)] = \max_{\substack{x=0,...,M-1 \\ y=0,...,N-1}} \{f(x,y)\}$$

An aggregate deviation of an operator may be defined using two (possibility different) aggregators as:

$$AD[f(x,y)] = A_1[f(x',y') - A_2[f(x,y)]]$$

One non-limiting example of an aggregate deviation is a max-min (1-infinity) deviation:

$$AD_\infty[f(x,y)] = \max_{\substack{x'=0,...,M-1 \\ y'=0,...,N-1}} \left[ f(x',y') \min_{\substack{x=0,...,M-1 \\ y=0,...,N-1}} [f(x,y)] \right]$$

where $A_1$ is substituted with the max aggregator and $A_2$ with the min aggregator. To determine an aggregate relative derivative (ARD), an aggregator A and an aggregate deviation AD are chosen, such that:

$$S(B) = \frac{A[|d_X(x,y)| + |d_Y(x,y)|]}{AD[B(x,y)]}$$

That is, S(B) represents ARD. In one embodiment, A is the max aggregator, and AD is the max-min aggregate deviation. However, it is noted that other selections can also be used. For example, in another embodiment, A could be a mean, or a $K^{th}$ largest element (from some integer K), while Ad could be a max-mean, mean absolute deviation from a mean (mean-abs-mean), standard deviation (root mean square deviation from the mean), or any of a variety of other selections. Thus, it should be noted that while the following is illustrated using a particular selection for A and AD, others are also envisaged, and thus embodiments are not to be limited to a particular selection for A and AD.

Moreover, it can be shown that the ARD is a measure of defocus blur around an image location. The defocus blur can be modeled, in one embodiment, as a convolution of the image with a blur kernel, such as a Gaussian, or similar. For simplicity, the following is based on a one-dimensional example, but can be readily extended, such as by way of separability or similar ways.

Thus, given:

$$K(x) = \frac{1}{\sqrt{2\pi\sigma^2}} e^{-\frac{x^2}{2\sigma^2}}$$

The standard deviation (a) may be seen to be monotonically increasing with a distance an object is from a plane of focus of a lens and with the lens' aperture. Then, assuming a given block includes an ideal edge, for example, having a structure of the form:

$$I(x) = \begin{cases} H & x \le t \\ 0 & x > t \end{cases}$$

Then the given block will be:

$$B(x) = \int_x K(x')I(x-x')dx'$$

It may then be seen that the maximal derivative of B is the maximal derivative of K, multiplied by the edge magnitude H, or $$d_{max}(B) = H \cdot \sigma^{-1} \cdot \left[ \frac{1}{\sqrt{2\pi}} e^{-\frac{1}{2}} \right]$$

That is, it is inversely proportional to the standard deviation, and directly proportional to the edge magnitude. Since under many circumstances the aggregate deviation can give an estimate of the edge height H, and the aggregate derivative—an estimate of $d_{max}$, the ARD is then seen as being inversely proportional to a and therefore monotonically proportional to a distance from the plane of the focus. That is, it provides a measurement for foreground/background segmentation.

Single Image Embodiment

Figure 4:
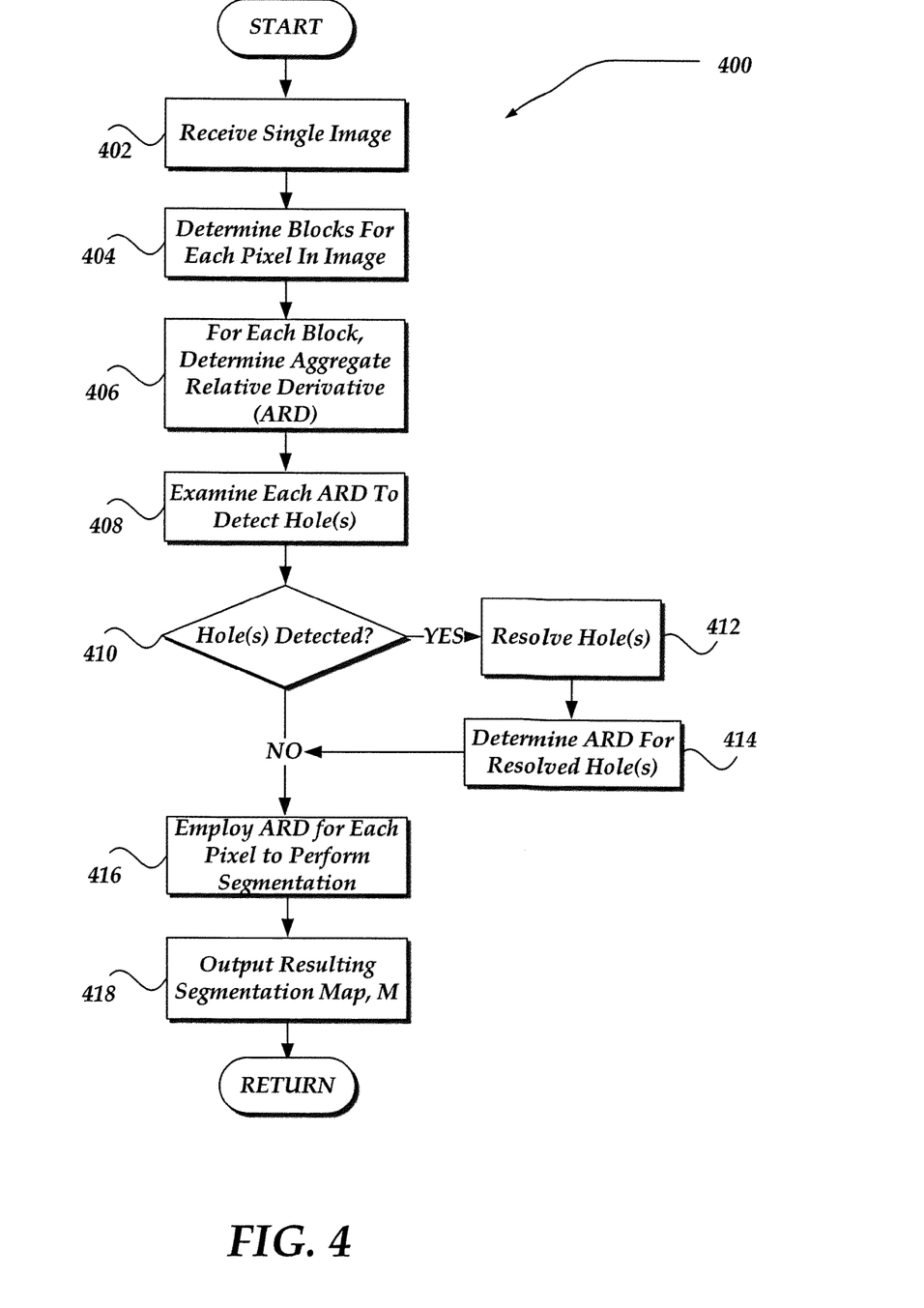
FIG. 4 illustrates a logical flow process generally showing one embodiment of a process usable to determine a segmentation of an image using a single image.

FIG. 4 illustrates a logical flow process generally showing one embodiment of a process usable to determine segmentation of an image using a single image. Process 400 of FIG. 4 may be implemented in the systems disclosed in FIGS. 1-3.

Process 400 begins, after a start step, at step 402 where a single image is captures. For example, when a user presses a shutter button, or inputs a similar instruction, the image capturing device, such as system 100 of FIG. 1, captures a single image that may be focused on a foreground object. In such a focusing arrangement, background or objects appearing in a distance from the camera lens will typically be blurred due to defocus of the lens. In any event, the image may be captured, converted to a digital data, using any of a variety of mechanisms. In one embodiment, the image is captured in a raw (Bayer format). However, the image may be converted to another format, such as YUV. For example, the image data may be converted or otherwise represented by three components of a captured image signal; namely, a luminance component (Y), and two complementary chrominance (color differences) components (V=R−Y) and (U=B−Y). Such image format is sometimes known as the YUV format. Further, the image data may be composed of a plurality of digital pixels.

In any event, processing moves next to step 404, where around each image pixel is created an M×N block. The selection of M and N depends upon engineering judgment, and further based on a computational power of the system performing the analysis, a resolution of the image, as well as other factors. In one embodiment, M=N=32. However, other values may also be selected. Because each pixel in the image has an associated block, it is readily recognized that blocks may be overlapping with other blocks. Thus, pixels may be in multiple blocks, although a given block is assigned to a signal pixel. For pixels on an border or side of the image, the block by be created using a variety of mechanisms, including, for example, allowing the assigned pixel to theoretically exist within a center of the block, where some of the block may not actually cover any neighboring pixels. In another embodiment, the assigned pixel might reside within a side portion of its block.

In any event, processing then continues to step 406, where for each block for the image, an aggregate relative derivative (ARD) is calculated as discussed above, as the aggregate derivative in a block divided by the aggregate deviation for the block. In one embodiment, an ARD map having an ARD value for each pixel within the image may be generated.

Processing then proceeds to step 408, each ARD value is evaluated to determine whether there are any invalid ARD values. Such invalid ARD values may arise, for example, when there is not a strong edge present in a given block. However, for any of a variety of reasons, a block may not include a strong edge. This may arise based on a characteristic of the image, a number of blocks selected in which to divide the image, or the like. When strong edges are not in the block, the ARD derivatives may then be too small for a proper calculation of ARD.

Therefore, to address cases in which the ARD may be invalid, a validity analysis may be performed. A variety of criteria may be used to determine a validity of the ARD for a block. Thus, at step 408, each block may be examined to determine whether the aggregate deviation and aggregate derivate values are greater than a respective tolerance value. Moreover, the minimum, maximum, and mean pixel values may also be examined to determine whether the maximum is not close to saturation (by a definable tolerance value), the minimum is not close to an intrinsic noise level (by some other definable tolerance value), and the mean is not close to the minimum or the maximum (that is, the distribution is not heavy tailed) (by some other tolerance values). If any of these evaluations are found to be invalid, then it may be determined that for the given block, there exists an invalid 'hole,' and thus, the ARD is invalid.

Flowing next to decision step 410, a determination is made whether a hole is detected for any of the blocks for the image. If one or more holes are detected, processing flows to step 412; otherwise, processing flows to step 416.

Figure 5:
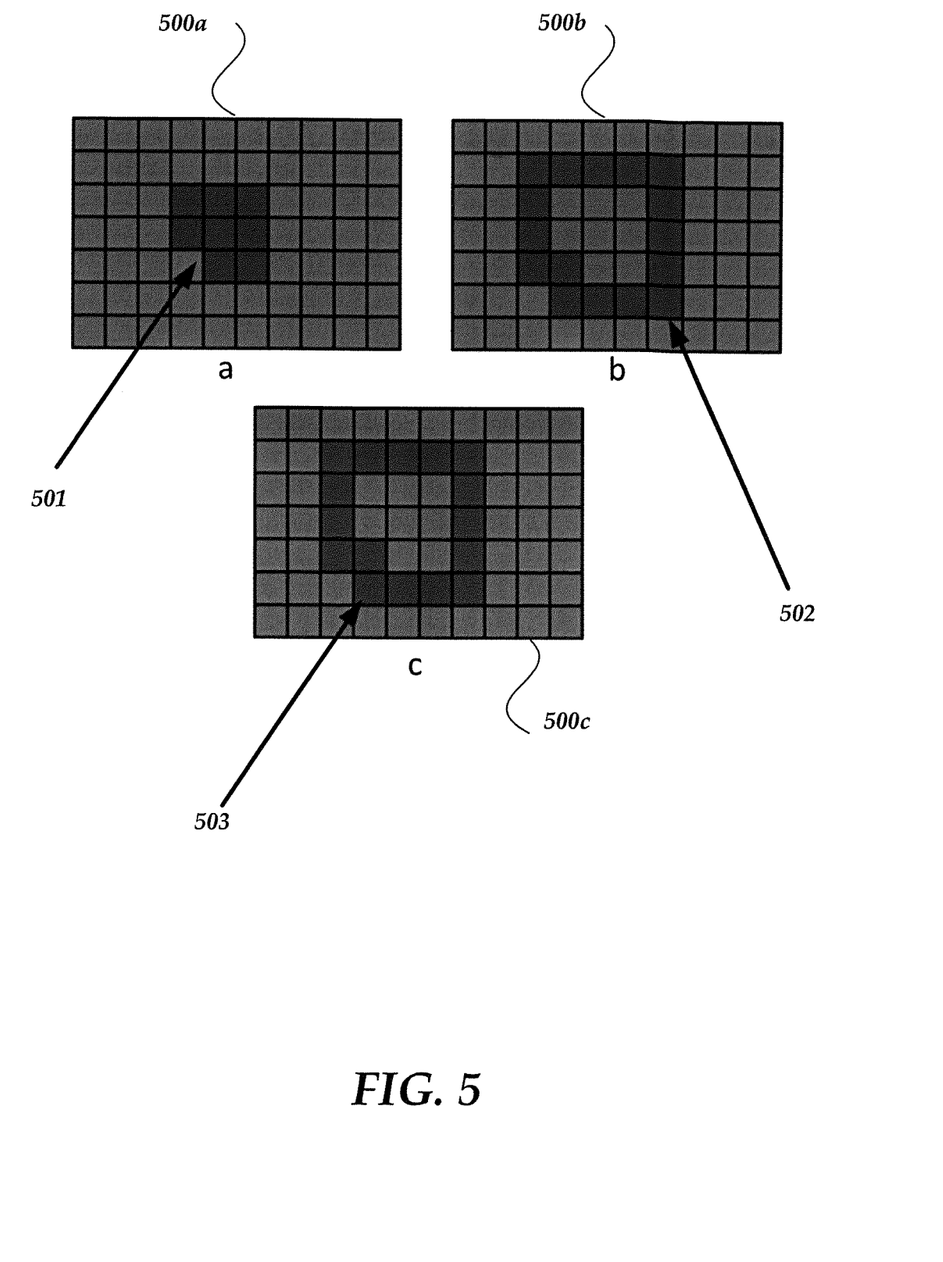
FIG. 5 illustrates one non-limiting, non-exhaustive example of resolving invalidity holes with at least an Aggregate Relative Derivative (ARD) mapping.

At step 412, the holes may be filled using the following procedure, which is illustrated in FIG. 5. That is, FIG. 5 illustrates one non-limiting, non-exhaustive example of resolving invalidity holes within a block. As shown in FIG. 5 image 500a illustrates a plurality of connected blocks, with a subset of blocks 501 having been determined to have invalid 'holes,' based on the criteria discussed above. Connected blocks are those blocks having invalid 'holes' that are 'adjacent' to each other, or connected, to form a single unitary form, such as shown by blocks 501. Although, for ease of illustrations, the blocks are illustrated as non-overlapping, it should be understood, that they may also be overlapping.

In any event, finding blocks 501 may be performed, for example, using a process such as "connected components analysis,' where the map of invalid measurements is scanned and each measurement is labeled with a label that corresponds to any invalid neighbors that the invalid block may have.

Then, for each connected 'blob' or connected blocks 501, each being invalid, a border 502 (seen for image 500b) is found for the invalid region created by the blocks 501. The border is composed of blocks surrounding the invalid blocks 501, where each of the blocks within the border 502 has valid measurements. In one embodiment, the border 502 may be determined using morphological dilation and subtraction. Because the blob or connected blocks 501 is connected, it has no invalid neighbors, so the entire border 503 has all of its blocks having valid measurements.

The hole of connected blocks 501 may then be filled with values from the border 503. For example, in one embodiment, the hole may be replaced by an average value of all of the blocks constituting border 503, effectively removing the invalid hole. In one embodiment, the values may be the derivative values, maximum, minimum, and/or mean values. In another embodiment, the values are the calculated or average ARD value.

Returning to process 400 of FIG. 4, processing then flows to step 414, where the replaced values may then be used to compute a new ARD for the resolved blocks. In another embodiment, the replaced ARD may then be used to update the ARD map created at step 406. Processing then flows to step 416.

At step 416, the ARD for each pixel is then used to perform segmentation of the image. Segmentation may be performed using a variety of mechanisms. For example, in one embodiment, segmentation may be performed using thresholding. That is a threshold may be applied to the ARD map, and various morphological operations may be performed on a resulting binary image.

For example, by applying optics theory, when a lens is focused at a distance R, then an object at distance R+D may have a blur radius of $KD(R+D)^{-1}$, where K does not depend on D, but rather on parameters of the image capturing device, such as aperture, focal length, distance of focus R, and so forth). A minimal distance from which to decide on a background may be selected, such as some proportion of the object distance R. A function T(.) may be selected as an inverse of $$f(D) = KD(R+D)^{-1}$$

That is:

$$D = T(w) = \frac{Rw}{K - w}$$

where w, the width of the blurring kernel, is directly proportional to the ARD. Then, given R and K, which may be calculated from the camera parameters and position of the focus motor for the image capture device, a threshold for D may be selected. For example, in one embodiment, a fixed proportion may be selected, such as $D = \alpha R$.

It is noted that T(w) need not actually have to be calculated for every pixel. For example, in one embodiment, it can be used to evaluate the threshold in the ARD domain (by plugging the threshold into f(D) above), and performing the operations there.

In one embodiment, for each block having, for example, an ARD that is greater than the determined threshold, the assigned pixel for that block may be selected at step 416 as a foreground pixel. Pixels for which its block has an ARD that is equal to or less than the determined threshold may be assigned as a background pixel.

In the extension, multiple threshold values may be used, where, for example, a block may be assigned to one of multiple background segments based on whether its ARD is within a range of threshold values.

Process 400 may then flow to step 418, where each pixel in the image is assigned to a foreground or background segment as discussed above. A segmentation map, M(x,y) may then be generated that includes each of these decision results. The segmentation map, M(x,y) may then be output for use with the image. Process 400 may then return to a calling process.

It should be noted that other mechanisms may also be used at step 416 to perform segmentation of the image. For example, in another embodiment, segmentation may be performed by examining image pixel values using a segmentation graph with a cost function.

Figure 7:
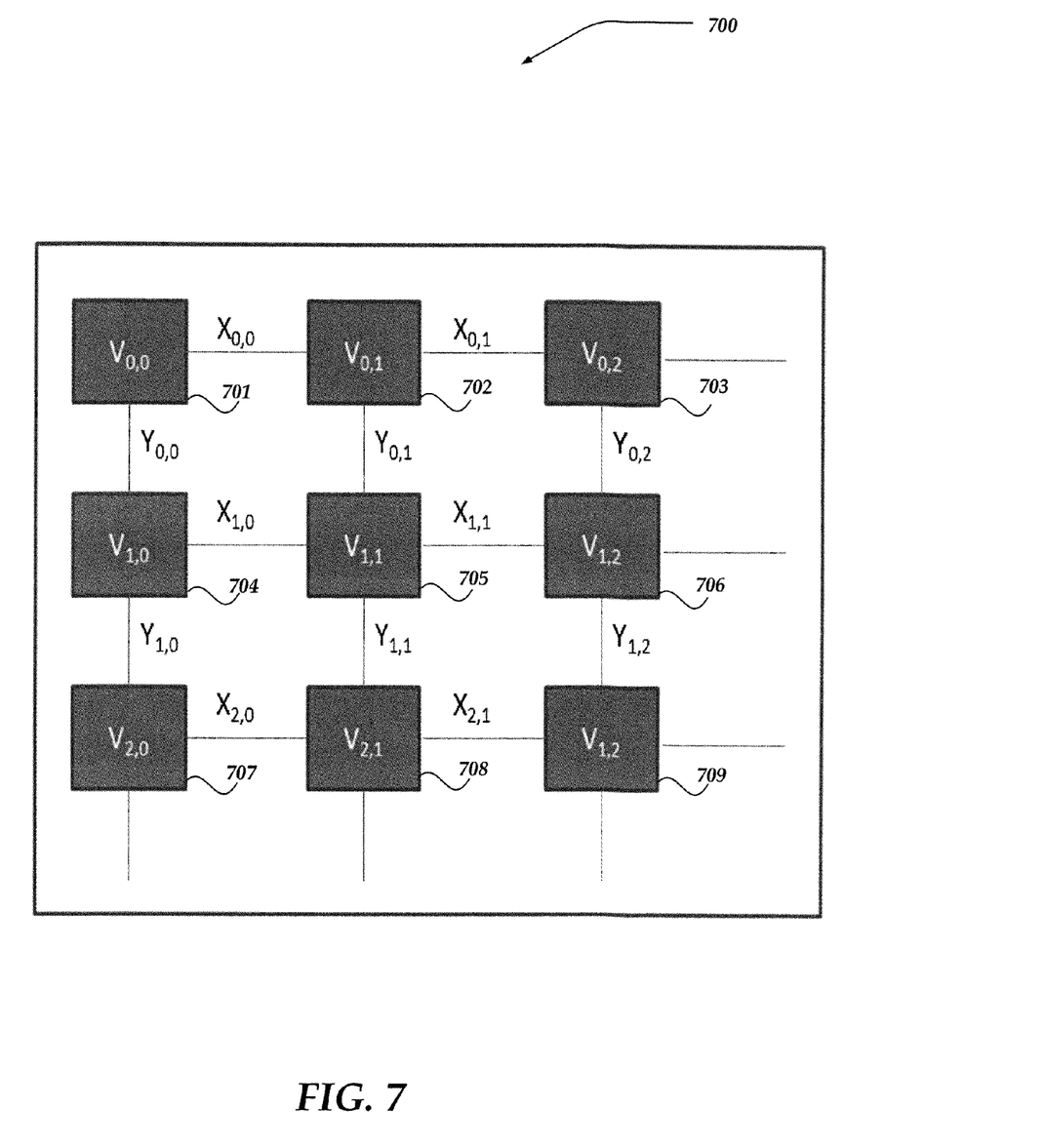
FIG. 7 illustrates one non-limiting, non-exhaustive segmentation example of a graph node with edge weights useable in one embodiment of a segmentation of an image.

Thus, in this approach, a graph is constructed based on the image. Each pixel in the image corresponds to a node in the graph, which is connected by edges to neighboring nodes.

FIG. 7 illustrates one non-limiting, non-exhaustive segmentation example of a graph node with edge weights useable in one embodiment of a segmentation of an image. Graph 700 may include many more or less components than those shown. The components shown, however, are sufficient to disclose an illustrative embodiment. As shown, are nodes 701-709. Graph 700 may include more or less nodes than shown, and as such, graph 700 may represent an incomplete showing of nodes for an image.

In any event, a segmentation goal may be used to attach a label $L_{y,x}$ to each node which is 1 for foreground and 0 for background. Each of the nodes then may have an associated cost for each label of:

$$V_{y,x}[L_{y,x}]:\{\{0\},\{1\}\} \to \mathbb{R}$$

Each of the horizontal edges has an associated cost of:

$$X_{y,x}[L_{y,x}, L_{x+1}]:\{\{0\},\{1\}\}^2 \to \mathbb{R}$$

With vertical edges having an associated cost of: $Y_{y,x}$. Now, a cost is chosen so that the node costs account for the ARD. That is, a low ARD means a low cost for label '1' and a high cost for label '0'. A high ARD selects the opposite values. The edge costs accounts for the similarity between pixels. It may be reasoned that pixels with similar appearances are more likely to belong to the same object in the image. Therefore, switching labels between the pixels should be penalized by a higher cost.

The segmentation goal then is to minimize the total cost:

$$\operatorname*{argmin}_{L} \left\{ \sum_{x=0}^{M} \sum_{y=0}^{N} V_{y,x}(L_{y,x}) + \sum_{x=0}^{M-1} \sum_{y=0}^{N} X_{y,x}(L_{y,x}, L_{y,x+1}) + \sum_{x=0}^{M} \sum_{y=0}^{N-1} Y_{y,x}(L_{y,x}, L_{y+1,x}) \right\}$$

There are several algorithms usable to achieve this minimization, including for example, a Normalized Cuts algorithm, an approximate inference on Markov Random Fields, and the like. Embodiments are not constrained and any of these or others may be used to solve the above segmentation.

In still another embodiment, other segmentation mechanisms may be employed at step 416 of FIG. 4. For example, the ARD map values may be used an input to a function D(.), which transforms the ARD values to a depth estimate for each pixel, effectively creating a depth map for the image. The function D(.) may again be selected based on a variety of characteristics of the digital camera, lens, aperture, focal length, and so forth, as discussed above. Using the depth map, the extent of the foreground may be determined by selecting pixels which are close in both depth and location to the estimated location and depth of the foreground subject.

Multiple Image Embodiments

Figure 6:
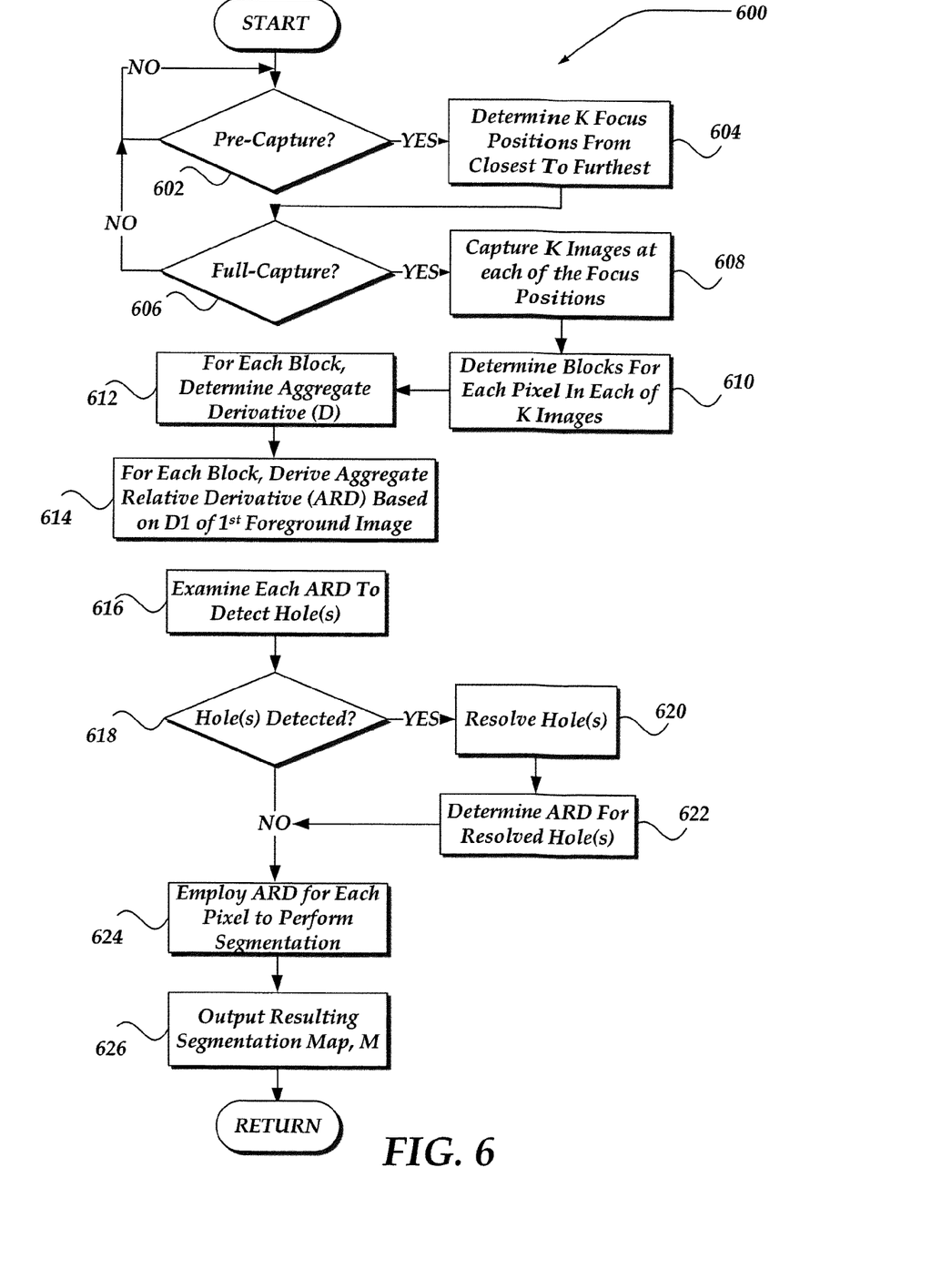
FIG. 6 illustrates a logical flow process generally showing one embodiment of a process usable to determine a segmentation of an image using a plurality of images captured based on a predetermined focus range.

In other embodiments, multiple images may be used to segment an image within the multiple images. FIG. 6 illustrates a logical flow process generally showing one embodiment of a process usable to determine a segmentation of an image using a plurality of images captured based on a predetermined focus range. Process 600 of FIG. 6 may be implemented within the systems discussed above in conjunction with FIGS. 1-3.

Process 600 of FIG. 6 begins, after a start step, at decision step 602, where a determination is made whether the image capturing device is in a pre-capture mode. In one embodiment, this might arise, where an indication is received that a shutter button is half-pressed. However, other indicators may also be received, including from a switch, a code option haven been set, or the like. In any event, when it is determined that the image capturing device is in pre-capture, processing flows to step 604; otherwise, processing flows to decision step 606.

At step 604, the image capturing device determines on a focus position of a furthest object within an image from a photo-sensor within the device. This may be achieved using any of a variety of mechanisms, including, but not limited to using an auto-focusing feature, and selecting a last peak of an average image-wide sharpness, measured, for example, by a mean absolute derivative, as the focus moves from macro to infinity focus positions. Further, a closest focus position may also be determined using somewhat similar mechanisms. However, as noted, any of a variety of mechanisms may be used. Then for a range of focus positions from the closest determined focus position to the furthest focus position, a plurality of other focus positions may be calculated. In one embodiment, the resulting number of focus positions, including the closest and furthest positions, are K, where K is two or greater. A selection of K may be based on a variety of factors, including based on a number of objects determinable within the scanned range, how large the determined range is, and the like. Thus, in one embodiment, K might range from 2 to over 8. In any event, K may result in equal divisions of the range of positions. However, in another embodiment, K might be based on the determinable number of objects, and may then be non-uniform, arranging focus positions within the range to be close to (within a defined tolerance) of a determinable object. In any event, K different focus positions are determined. Processing flows next to decision step 606.

At step 606, a determination is made whether the image capturing device is in full-capture mode. This may be determined for example, based on the shutter button being fully depressed, as in a mode for capturing images. Other indicators may also be employed. In any event, if the device is determined to be in full-capture mode, processing flows to step 608; otherwise, processing may loop back to decision step 602.

At step 608, K images are captured, one for each of the focus positions. In one embodiment, the first image is focused at the foreground object using the first K focus position, the last image is focused at the furthest object in the scene of the image, using the last K focus position, and the rest of the images are captured using the other focus positions in-between these two extreme focus positions.

Processing then flows to step 610, where blocks are determined for each pixel in each of the N captured images. Process 600 flows next to step 612. In the case of multiple images, the ARD can be calculated in a different manner than discussed above for a single image. Since the aggregate deviation is anticipated to be the same in collocated blocks across all of the images, the ratio of the ARD calculated at one image and the collocated ARD in a different image is not dependent on it; and instead is inversely proportional to the blurring r of the first image and directly proportional to the blurring r of the second image. Therefore, in one embodiment, the calculations may be simplified, by calculating a ratio of the aggregate derivative—or the nominator of the ARD (see S(B)) calculation above—in a block around each image pixel.

Processing then flows to step 614, where for each block, where $D_i$ is the aggregate derivative for that block in the $i^{th}$ image, the ARD for the image set can then be determined as:

$$ARD = \max_{i=2,\ldots,N} \frac{D_1}{D_i}$$

Processing then flows to step 616, where each ARD is examined to determine whether the ARD is valid. This action is substantially the same as discussed above at step 408 in conjunction with FIG. 4. Further, steps 618, 620, and 622 perform actions similar to the discussions above in FIG. 4 for detecting and/or resolving any detected holes. Thus, step 622 flows to step 624, and when no holes are detected at decision step 618, processing also flows to step 624.

At step 624, the determined ARD for each pixel may then be used to perform segmentation. In one embodiment, a process such as segmentation by thresholding, as discussed above for single images may be employed. In another embodiment, segmentation may also be performed using any of the other methods also discussed above in conjunction with the single image embodiment.

Thus, using thresholding for segmenting the image, again, the threshold(s) may be determined based on a camera aperture diameter, focal length, and/or the focus positions of the multiple images involved. In one embodiment, the threshold (s) may be predetermined as discussed above and can be found by experimental calibration, calibration during production or manufacturing stages for the image capturing device, or the like, and stored in a memory location within the device. That is, in one embodiment, thresholds might be determined in the ARD domain based on one or more test images, such that segmentation is obtained on the test images that satisfy some defined criteria. This might be achieved by varying the aperture (measured in sensor pixels, for example), focal lengths (in sensor pixels), and distance (again, in sensor pixels), and then applying a configuration in the field.

However, in still another embodiment, at block 614, the ARD might be computed using a different mechanism. For example, an N−1 number of ratios might be determined where each ratio is of the aggregate derivative between the first (focused at the foreground) image and every other image, giving a total of N−1 ratios. Each ratio $R_i$ might then be compared to a threshold $\theta_i$ and blocks in which $R_i > \theta_i$ for all I, are considered as foreground. Other comparisons of the ratios might also be analyzed, including, but not limited to aggregating the decisions, and/or performing a majority vote decision, or selecting based on any of a variety of other selection criteria.

In any event, processing then flows to step 626, where a segmentation map, M(x,y) may again be output, similar to step 418 of FIG. 4 discussed above. Process 600 then may return to another process.

Relationship Between ARD and Blur Widths

Figure 8:
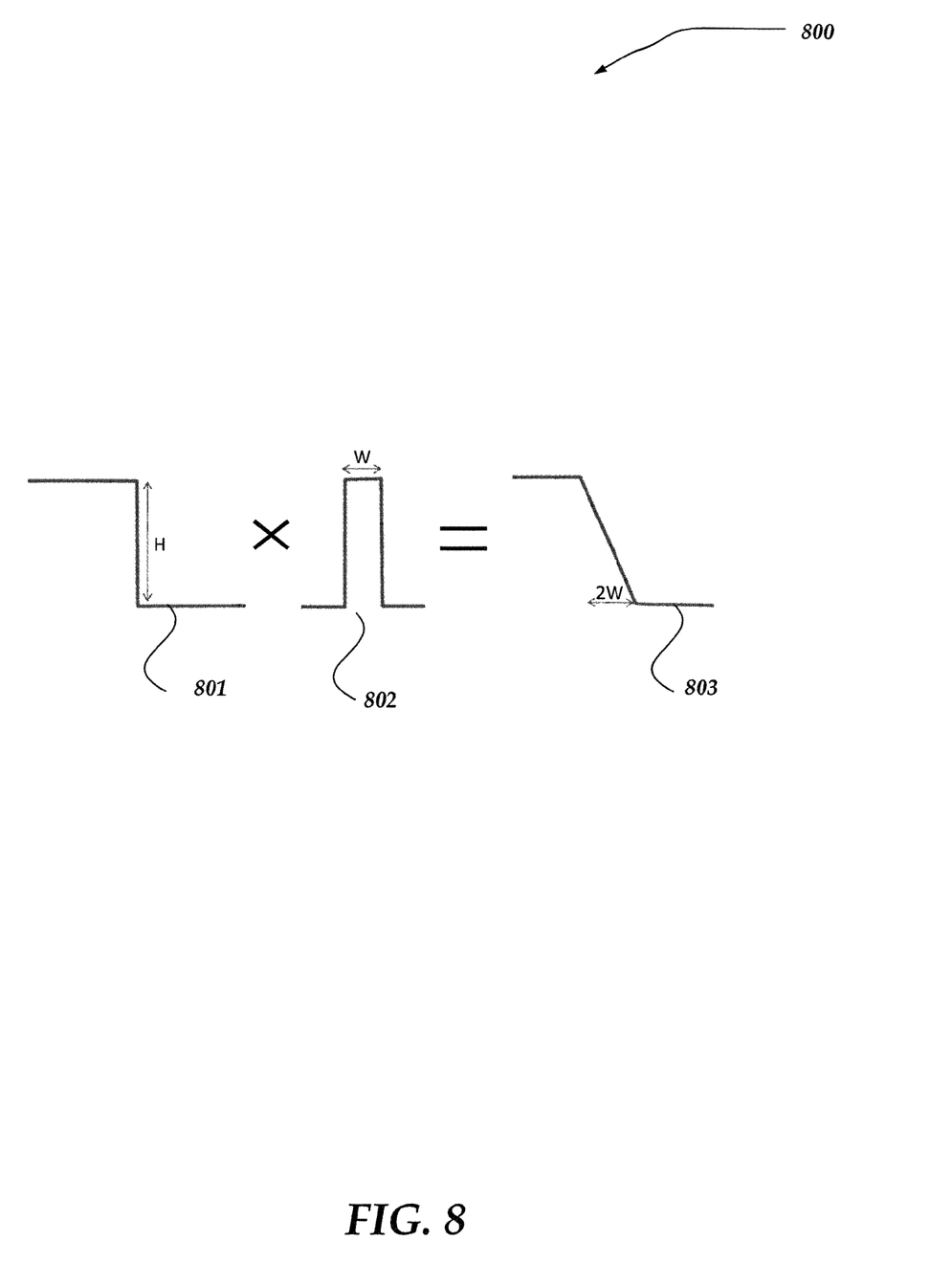
FIG. 8 illustrates one non-limiting, non-exhaustive example of convolving with a blurring kernel in one-dimension.

FIG. 8 illustrates one non-limiting, non-exhaustive example of convolving with a blurring kernel in one-dimension, and intended to illustrate how a typical lens blurring kernel might operate on an ideal edge. In FIG. 8, an ideal edge 801 is illustrated with width of zero, and height of H. As seen, ideal edge 801 may be blurred by a kernel 802 having a width of W to produce an edge 803 having a height of H and width 2W. The maximal derivate D in this case would then evaluate to about H/2W, and D/(Maximum−minimum) would give $(2W)^{-1}$. If a strong ideal edge exists in a block, this metric can be used directly to estimate a width of the blurring kernel.

Alternative Embodiments

Optional Pre-Processing—Image Alignment

Since images in the above, may be taken using a hand-held camera, or other image capturing device, the camera may move slightly between frames for the multiple image embodiment. This may cause the images to move or rotate between the frames. To compensate for this, an estimate of how to move an image in order to be aligned (sometimes called registration) with another may be determined.

One embodiment of a robust approach to align the images includes attempting to estimate a parametric function T: $R^2 \rightarrow R^2$, which represents a relationship between image coordinates in one image and image coordinates in a second image. One example includes the affine function:

$$x'=a_{11}x+a_{12}y+a_{13} \quad y'=a_{21}x+a_{22}y+a_{23}$$

In order to estimate the model, motion vectors may be first extracted between corresponding pixels in the two images and an estimate of the global motion transform may be derived.

Motion Vector Extraction

Correspondences may be found between the two images, which are locations in one image which match locations in another image. One non-limiting approach for motion searches might employ a scheme similar to one described in "Techniques Of Motion Estimation When Acquiring An Image Of A Scene That May Be Illuminated With A Time Varying Luminance," U.S. patent application Ser. No. 11/754,104, filed on May, 25, 2007, which is incorporated herein in its entirety. However, other approaches may also be used.

In any event, the motion search may include a mean-reduced SAD (MR-sum of absolute differences) based, for example, a motion of a block of pixels in one frame is determined by the location of the block in the other frame for which the MRSAD is determined to be a minimal. One frame can be denoted as 'target'—$I_T$ and the other as 'reference,'—$I_R$. Then, $$MRSAD(x, y, u, v) = \sum_{i=0}^{B_X-1} \sum_{j=0}^{B_Y-1} |I_T(x+i, y+j) - I_R(x+u+i, y+v+j) - M_T(x,y) + M_R(x,y)|$$

Where:

$$M_T(x, y) = \frac{1}{B_X B_Y} \sum_{i=0}^{B_X-1} \sum_{j=0}^{B_Y-1} I_T(x+i, y+j)$$

$$M_R(x, y) = \frac{1}{B_X B_Y} \sum_{i=0}^{B_X-1} \sum_{j=0}^{B_Y-1} I_R(x+i, y+j)$$

Then:

$$(MV_x(x,y), MV_y(x,y)) = \arg\min_{\substack{-A_X \leq u \leq A_X \\ -A_Y \leq v \leq A_Y}} (MRSAD(x,y,u,v))$$

Wherein $B_X$, $B_Y$ define the size of the block, and $A_X$ and $A_Y$ define the search area.

The motion search may be performed using any special purpose hardware accelerator implemented on an integrated circuit, which accepts the reference and target image, and returns a list of "motion vectors" for each block in the images. In addition, the motion search can be performed on a low resolution copy of the images, and then be refined by performing an additional search in a higher resolution. The motion search can be further improved by applying corner detection on the images, since corners are more likely to return reliable motion vectors. Also, a robustness measure can be extracted by observing the MRSAD map as a function of a (u,v) motion vector and seeing if the minima that produced MV(x,y) is unique.

Global Motion Estimation

After motion searches are performed, a set of correspondences in each image pair is obtained as:

$$(x_i, y_i) \leftrightarrow (x_i', y_i') = (x_i + MV_x(x_i, y_i), y_i + MV_y(x_i, y_i))$$

A Random Sample Consensus (RANSAC) algorithm may be used, in one embodiment, for the estimation of the transformation from these correspondences. One process can iteratively build the transformation estimates and reject outliers. The final transformation may be calculated by taking the group of all inliers (which may be labeled as "I"), and estimating a transformation by a least squares, (linear regression) equations:

$$\begin{pmatrix} a_{11} \\ a_{12} \\ a_{13} \end{pmatrix} = \begin{pmatrix} \sum x_i^2 & \sum y_i x_i & \sum x_i \\ \sum y_i x_i & \sum y_i^2 & \sum y_i \\ \sum x_i & \sum y_i & N \end{pmatrix}^{-1} \begin{pmatrix} \sum x_i x_i' \\ \sum y_i x_i' \\ \sum x_i' \end{pmatrix}$$

$$\begin{pmatrix} a_{21} \\ a_{22} \\ a_{23} \end{pmatrix} = \begin{pmatrix} \sum x_i^2 & \sum y_i x_i & \sum x_i \\ \sum y_i x_i & \sum y_i^2 & \sum y_i \\ \sum x_i & \sum y_i & N \end{pmatrix}^{-1} \begin{pmatrix} \sum x_i y_i' \\ \sum y_i y_i' \\ \sum y_i' \end{pmatrix}$$

Wherein the summation is over $\forall i \in I$ and $N=|I|$. All the summations can be performed in fixed point arithmetic, while the matrix inversion may be performed using floating point—to improve speed. It is noted that while the affine transform is given as an example, other parametric transformations can be considered as well, and thus embodiments are not constrained to this approach.

Further, based on the estimated global transformation, a hardware-based warping mechanism may transform one of the images onto the other image's coordinates.

Optional Post-Processing

A variety of other techniques may also be applied. For example, in one embodiment, the foreground/background separation might undergo morphological operations which may crate a single connected and closed foreground patch. This can be done by performing morphological closing, determining connected components and then choosing a single component by a certain feature of that component, for example, by selecting the largest component.

Other morphological operations may be applied, for example, dilation, to better cover borders of the foreground object, or the like.

In an optional embodiment, a binary hard separation may be transformed to a fuzzy continuous separation. For example, the binary separation may be represented as zero or one for background or foreground, respectively, and then treated as an image and filtered with a blurring filter, such as a Gaussian filter, to create a fuzzy decision border, for use in segmentation.

In still other optional embodiments, not all of the images might be the same resolution. In one embodiment, the first image, focused at the foreground object, might be at full resolution, and the rest of the images might be in a reduced resolution.

In another embodiment, the images might be captured at full resolution in the horizontal direction, but at a reduced resolution in the vertical direction, allowing for a faster readout of the image from the imaging sensor.

Using Segmentation

After completing process 4 or 6, an output M(x,y) is obtained, which means that the pixel at (y,x) belongs to the foreground if M[y,x]=1, otherwise if M[y,x] is zero it is background. Although other representations may be used.

The segmentation can then be used in order to reproduce an exaggerated defocus blur. Defocus blur on the background of a photo may provide a useful tool to accentuate the foreground objects, but with small sensor cameras it may be very hard to achieve. The above approach may provide a solution. For example, the foreground/background segmentation can be used to achieve a background blur as follows:

1. Take the original image F, and create a copy G.
2. Blur G using a wide disk kernel to simulate lens defocus. To reduce computational complexity, can downscale G first (say by factor of 4 on each axis) and filter with narrow disk kernel, and then upscale back.
3. Blur the mask M with small Gaussian filter in order to achieve smooth transitions where the mask changes from 0 to 1 or 1 to 0.
4. Create an output image H=M*F+(1−M)*G, where the blending is performed per pixel.

The segmentation can be used to "cut out" an object in an image and past it onto a different background. This can be performed using the following, for example:

1. Take original image F.
2. Take desired background image B.
3. Blur the mask M for smooth transitions as above.
4. Create an output image H=M*F+(1−M)*B Clearly, a plurality of other applications may also be performed, and thus, the above is not to be construed as limiting or otherwise narrowing the scope of the embodiments herein. For example, in ne embodiment, particular actions may be performed on the foreground segment (or background segment) to enhance various aspects, such as tone, colors, graying, or any of a variety of other features of one or more images within a segment.

Further, it will be understood that each component of the illustrations of the figures, and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

What is claimed as new and desired to be protected by Letters Patent of the United States is:

1. An apparatus, comprising:
   image capturing device useable to capture one or more images and providing the images as digital images; and
   one or more circuit components that perform actions, including:
      receiving the captured digital one or more images;
      determining for the one or more images an aggregate relative derivative (ARD) for each pixel in at least one of the images, the ARD being calculated from a derivative metric in a block assigned to each pixel, the derivative metric being determined from maximum and minimum derivatives for horizontal luminance derivatives and vertical derivatives within the block; and
      using the ARD to segment pixels in the at least one of the images into one of a foreground or a background segment of the image.

2. The apparatus of claim 1, wherein the captured digital one or more images is a single image, and the ARD for each pixel is a ratio of the derivate metric over a deviation metric.

3. The apparatus of claim 1, wherein an output is a segmentation map indicating which pixels are segmented into the foreground and which pixels are segmented into the background, the output being used for replacing pixels identified in the background with pixels of a different background.

4. The apparatus of claim 1, wherein the one or more circuit components perform actions, further including:
   examining each ARD to detect invalid ARD values; and
   when an invalid ARD value is detected, performing:
      determining a border of blocks surrounding at least a block associated with the invalid ARD, and replacing the invalid ARD with a valid ARD based on ARD values from the border of blocks.

5. The apparatus of claim 1, wherein:
   receiving the captured digital one or more images further includes capturing a plurality of images, each image being captured at a different focus position, from a closest focus position having a foreground object in focus, to an image captured having a focus position having a furthest object in the image being in focus;
   and wherein determining for the one or more images the ARD further comprise:
      evaluating the derivative metric in a block assigned to each pixel in each image and in each collocated pixels in each of plurality of images, and using a ratio of the derivative metrics to generate the ARD for each pixel, the ARD being used to segment the pixels.

6. The apparatus of claim 1, wherein the one or more circuit components perform actions, further including: generating a closed and connected foreground blob using morphological processing, the foreground blob used to further segment the pixels.

7. A storage device having stored thereon processor-executable instructions that when loaded onto one or more processors enable actions to be performed, comprising:
   receiving a captured digital image;
   determining for the image an aggregate relative derivative (ARD) for each pixel in the image, the ARD being calculated from a derivative metric in a block enveloping to each pixel, the derivative metric being determined from maximum and minimum derivatives for horizontal luminance derivatives and vertical derivatives within the block and using the ARD to segment pixels in image into one of a foreground or a background segment of the image.

8. The storage device of claim 7, wherein at least one block enveloping a pixel also envelops another pixel, such that at least two blocks are overlapping.

9. The storage device of claim 7, wherein the segmentation of the pixels is used to replace at least one pixel identified as a background pixel with at least one other pixel.

10. The storage device of claim 7, wherein the processor-executable instructions perform actions, further including:
examining each ARD to detect invalid ARD values; and
when an invalid ARD value is detected, performing:
determining a border of blocks surrounding at least a block associated with the invalid ARD, and replacing the invalid ARD with a valid ARD based on ARD values from the border of blocks.

11. The storage device of claim 7, wherein the processor-executable instructions perform actions, further including: blurring of one or more pixels in the background segment while maintaining pixels in the foreground segment.

12. The storage device of claim 7, wherein the processor-executable instructions perform actions, further including: generating a closed and connected foreground blob using morphological processing, the foreground blob used to further segment the pixels.

13. The storage device of claim 7, wherein using the ARD to segment pixels further comprises one of comparing each ARD to a threshold value, or further transforming the ARD to a depth map for the image, the depth map being analyzed to segment pixels by at least selecting pixels which are determined to be close to in both a depth and a location to an estimated location and depth of a determined foreground object in the image.

14. An image system, comprising:
a memory device to receive one or more images; and
one or more processors that perform actions, including:
capturing a plurality of images, each image being captured at a different focus position, a first image in the plurality being captured such that a foreground object in the image is focused;
evaluating a derivative metric in a block around each pixel in the first image, and in each collated pixel in each of the other images in the plurality of images, the derivative metric being determined from at least a horizontal luminance derivative and a vertical luminance derivative for a given block;
using a ratio of the derivative metrics for each collocated pixel in the plurality of images to generate an aggregate relative derivative (ARD); and
using the ARD to segment pixels in the first image into one of a foreground or a background segment of the image.

15. The image system of claim 14, wherein the one or more processors further perform registration on each of the plurality of images as a pre-processing step before evaluating the derivative metric.

16. The image system of claim 14, wherein the segmentation of the pixels is used to enhance at least one feature of the background segment or the foreground segment.

17. The image system of claim 14, wherein the one or more processors perform actions further including:
examining each ARD to detect invalid ARD values; and
when an invalid ARD value is detected, performing:
determining a border of blocks surrounding at least a block associated with the invalid ARD, and replacing the invalid ARD with a valid ARD based on ARD values from the border of blocks.

18. The image system of claim 14, wherein the one or more processors perform actions further including: generating a closed and connected foreground blob using morphological processing, the foreground blob used to further segment the pixels.

* * * * *